United States Patent [19]

Bonner et al.

[11] 3,743,970

[45] July 3, 1973

[54] TEO₂ ACOUSTOOPTIC LIGHT DEFLECTOR

[75] Inventors: William Adam Bonner, Scotch Plains; Arthur Woodward Warner, Jr., Whippany; Donald Lawrence White, Bernardsville, all of N.J.

[73] Assignee: Bell Telephone Laboratories, Incorporated, Murray Hill, N.J.

[22] Filed: Dec. 6, 1971

[21] Appl. No.: 204,814

[52] U.S. Cl. .............................. 332/7.51, 350/160
[51] Int. Cl. ............................................ H01s 3/10
[58] Field of Search.................. 332/7.51; 350/149, 350/160, 161

[56] References Cited
UNITED STATES PATENTS
3,661,441   5/1972   Uchida et al. .................... 350/149

OTHER PUBLICATIONS

Dixon, "Acoustic Diffraction of Light in Anistropic Media," 2/67, pg. 85–93, IEEE, J.Q.B., Vol. QE–3, No. 2.

Ohmachi et al., "Temp. Dependence of Elastic . . . TeO₂ Single Crystals," 5/70, pg. 2307–2311, J.A.P., Vol. 41, No. 6.

*Primary Examiner*—Benjamin A. Borchelt
*Assistant Examiner*—N. Moskowitz
*Attorney*—R. J. Guenther, W. L. Keefauver et al.

[57] ABSTRACT

In an acoustooptic light deflector, frequency modulated acoustic shear waves propagate in the [110] direction in a paratellurite TeO₂ body and the light beam, which is elliptically polarized, propagates at a small angle to the optic axis of the TeO₂ body. The optical activity of paratellurite TeO₂ is exploited to produce an inflection point in the angle of incidence-versus-acoustic frequency characteristic of the deflector. The center frequency of the acoustic wave is made to be approximately equal to the inflection point frequency in order to obtain larger deflections at lower acoustic power than heretofore possible. In a preferred embodiment the TeO₂ body is grown by the Czochralski method from a starting material which is at least 99.9999 percent pure in order to obtain paratellurite TeO₂ crystals of low optical scattering loss as well as low acoustic absorption loss.

14 Claims, 6 Drawing Figures

3,743,970

TEO ACOUSTOOPTIC LIGHT DEFLECTOR

BACKGROUND OF THE INVENTION

This invention relates to acoustooptic light deflectors and more particularly to such deflectors using $TeO_2$.

It is now well-known in the art that when an acoustic beam of wavelength $\Lambda$ interacts with a light beam of wavelength $\lambda$, the former acts as a diffraction grating of spacing $\Lambda$ which deflects the light beam at an angle $\phi$ given by $$\phi = \phi = \tfrac{1}{2}\lambda/\Lambda = \tfrac{1}{2}\lambda/V\,f \qquad 1$$

when Bragg's law is satisfied. In equation (1) $\theta$ and $\phi$ are the angles which the incident and deflected light beams, respectively, make with the acoustic grating, and $V$ and $f$, respectively, are the acoustic velocity and frequency.

In this form of Bragg angle deflection, the angle of deflection $\phi$ is always equal in magnitude to the angle of incidence $\theta$. In order to scan the deflected beam through an angular range $\Delta\phi$ it is necessary to use a relatively narrow transducer of length L in order to spread the acoustic energy into an angular range $\Delta\theta = \Lambda/L$. Consequently, when the acoustic frequency is modulated by an amount $\Delta f$ (the bandwidth) the output light beam is scanned through an angle $\Delta\phi$ given by $$\Delta\phi = (\lambda/n)(\Delta f/V) \qquad 2$$

where $n$ is the index of refraction. It can be shown that the number of spots N resolvable by the scanned beam is $$N = (D/V)\,\Delta f = \tau\Delta f \qquad 3$$

where $D$ is the aperture of the incident light beam and $\tau$ is the access time, i.e., the time required for the light beam to cross the acoustic wave.

Several problems are inherent in such prior art acoustooptic light deflectors. Namely, for a given acoustic center frequency, the interaction length L must be decreased in order to increase the angle of deflection $\phi$ which in turn requires higher acoustic power. In fact, for reasonable angles of deflection and efficiencies, the acoustic power becomes so high in prior art c.w. devices that thermal strains in the acoustooptic material seriously distort the diffracted light beam.

In 1967, however, it was predicted by R. W. Dixon that, when the incident light beam is made to propagate perpendicular to the optic axis of a uniaxial birefringent crystal, deviations occur from normal Bragg diffraction. In an article entitled "Acoustic Diffraction of Light in Anisotropic Media" in the IEEE Journal of Quantum Electronics, QE–3, 85 (1967), he indicated that one such deviation was that the angle of incidence $\theta$ no longer was constrained to equal the angle of deflection $\phi$. In addition, he pointed out that the angle of deflection-versus-acoustic frequency characteristic of such deflectors using birefringent media exhibit an inflection point at a frequency $f'$ whereat $d\theta/df = 0$. By frequency modulating the acoustic wave about a center frequency equal to $f'$, Dixon showed that larger diffraction angles $\phi$ could be attained than theretofore possible.

Unfortunately, the inflection point frequency $f'$ for most useful birefringent acoustooptic media is in the gigahertz range where acoustic absorption losses are very high. Since, however, acoustic losses decrease with the square of the acoustic frequency, it would be desirable to utilize an acoustooptic material having a lower $f'$. In addition, the sound wave in such a material should have a relatively low velocity in order to increase the number of resolvable spots as given by equation (3).

One acoustooptic material which is birefringent and which also has a relatively slow velocity for shear waves propagating in the [110] direction is $TeO_2$ as suggested by N. Uchida et al in Journal of Applied Physics, 40, 4692 (1969). Using the teachings of Dixon, one calculates an inflection point frequency $f' = 1.17$ Ghz for an optical wavelength of about 0.44 $\mu$m and shear waves propagating in the [110] direction $TeO_2$. Even at 1.15 $\mu$m, which is still within the optical passband (0.33 $\mu$m to 4.5 $\mu$m) of $TeO_2$, $f'$ is about 0.45 Ghz which is still relatively high. Hence, a deflector designed to exploit the birefringence of $TeO_2$ would experience undesirably high acoustic losses at nearly all practical optical wavelengths within its passband.

SUMMARY OF THE INVENTION

We have made the surprising discovery, however, that the inflection point frequency of paratellurite $TeO_2$ can be reduced to the more useful tens-of-megahertz range, where acoustic losses are relatively low, by exploiting the optical activity of the material rather than its birefringence. Optical activity, as explained more fully in Jenkins and White, "Fundamentals of Optics," Ch. 28, McGraw Hill (3d Ed. 1957), is that characteristic of a material whereby elliptically or circularly polarized light propagating parallel to the optic axis has one of two velocities of propagation depending on the handedness of the polarization. More specifically, in an illustrative embodiment of our invention, acoustic shear waves are made to propagate along the [110] direction in $TeO_2$ and an elliptically polarized light beam is made to propagate at a small angle $\gamma$ to the optic axis of the $TeO_2$ crystal. At the inflection point frequency the deflected light beam is substantially perpendicular to the [110] direction. This combination results in inflection point frequencies ranging from about 18 MHz to 82 MHz for optical wavelengths ranging from 1.15 $\mu$m to 0.4416 $\mu$m. For a given incident angle $\theta$ and a given interaction length $L$, the diffracted light beam can be deflected over a larger angular range than heretofore (e.g., 2° as compared to 0.4° in $PbMoO_4$). Or, for a given bandwidth $\Delta f$ the interaction length L can be made longer which reduces the amount of acoustic power required and hence alleviates thermal strain problems.

We have found, in addition, that to achieve the foregoing highly desirable properties it is preferable that the paratellurite $TeO_2$ be grown by the Czochralski method from a starting material which is at least 99.9999 percent pure polycrystalline tellurium dioxide. Hereinafter in the specification, when $TeO_2$ is mentioned it will be assumed that paratellurite $TeO_2$ is meant.

BRIEF DESCRIPTION OF THE DRAWING

Our invention, together with its various features and advantages, can be easily understood from the following more detailed description taken in conjunction with the accompanying drawing, in which.

DETAILED DESCRIPTION

Figure 1:
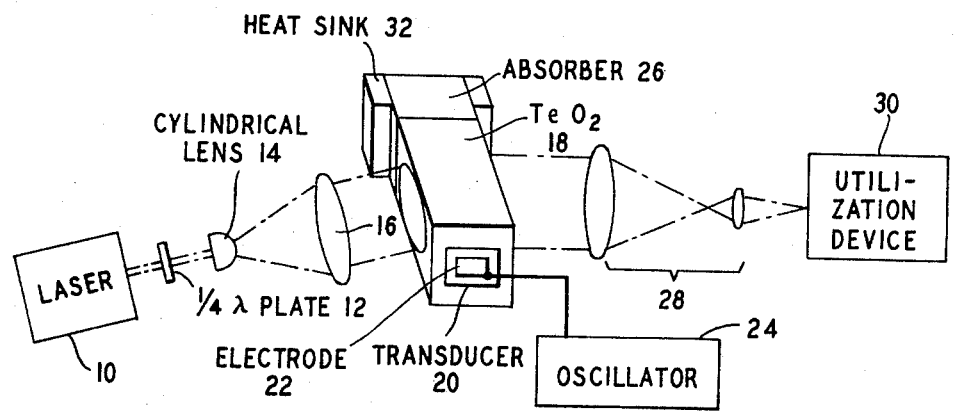
FIG. 1 is a schematic of an illustrative embodiment of our invention.

Turning now to FIG. 1, there is shown schematically a light beam deflection arrangement in accordance with an illustrative embodiment of our invention. A plane polarized light beam produced by laser 10 is passed through a quarter-wave plate 12 where it is converted to circularly polarized light. Preferably, however, the plate 12 may be replaced by a well-known compensator, such as a Soelil-Babinet compensator, to produce slightly elliptically polarized light in order to compensate for the off-optic-axis direction of the light beam to be described hereinafter. Next, the polarized light beam is passed through a cylindrical lens 14 to produce an asymmetric (elliptical) intensity distribution which increases the aperture D and hence increases the number of resolvable spots given by equation (3). At the same time an elliptically shaped beam reduces the beam size in the dimension normal to the direction of deflection which means that the transducer size in that dimension can also be reduced. This in turn permits the use of a smaller size TeO$_2$ crystal and less acoustic energy.

The elliptically shaped and elliptically polarized light beam is focused by lens 16 on the TeO$_2$ body 18. After the light beam and acoustic waves interact in body 18, the deflected light beam is focused by a telescope lens system 28 onto a utilization device 30. The latter is used to designate generally the many and varied uses of acoustooptic deflectors in, for example, real time display systems, hard copy systems and machining operations.

Figure 2A:
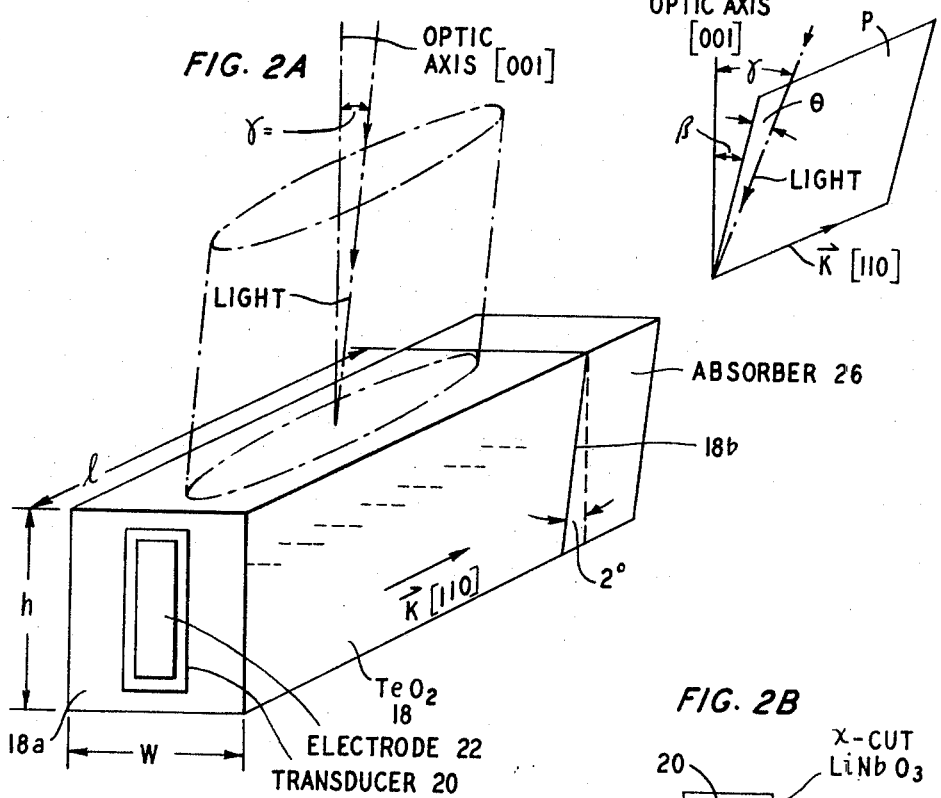
FIG. 2A is an enlarged view of the TeO$_2$ body of FIG. 1.
Figure 2C:
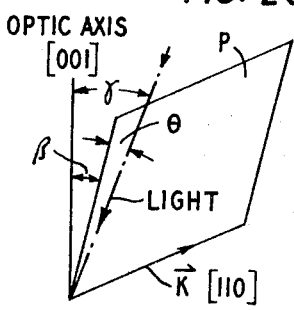
FIG. 2C shows the various directions of the light and acoustic beams relative to the optic axis.

As shown in greater detail in FIG. 2A, the TeO$_2$ body 18 is provided at one end 18$a$ with a transducer 20 on which is formed an electrode 22. The latter is connected to an oscillator 24 (FIG. 1) capable of producing a frequency modulated electrical output which, via transducer 20, launches an acoustic or elastic shear wave in the direction of the vector K, i.e., the acoustic shear wave propagates in the [110] direction and has a displacement vector in the [110] direction. The [110] direction for shear waves is chosen because the acoustic velocity of TeO$_2$ is lowest in that direction, i.e., about 0.617 × 10$^5$ cm/sec, which increases the number of spots N resolvable by the deflector as given by equation (3). As shown in FIG. 2C, in general the incident light beam propagates at a small angle $\gamma$ to the optic axis, where $\gamma$ is nonzero and is preferably less than about 20°. The plane P containing both the light and acoustic beams in general forms an angle $\beta$ with the optic axis, where $\beta$ is typically less than about 20° and may be zero. In addition, the incident light beam makes a small angle $\theta$ (e.g., 1° to 3°), the Bragg angle, with the normal to the direction of the acoustic waves.

In operation, the shear waves interact with the incident light beam which is deflected through an angular range related to the acoustic frequency swing $\Delta f$. Importantly, the light beam angle of incidence-versus-acoustic frequency characteristic exhibits an inflection point at which the deflected beam is substantially perpendicular to the acoustic beam, i.e., to the [110] direction. Note that for a given inflection point frequency, the angles $\gamma$, $\beta$ and $\theta$ are uniquely determined. If the light beam is in the (1$\bar{1}$0) plane ($\beta = 0$), the angle $\gamma$ will be equal to the angle $\theta$. However, the plane P defined by the acoustic and light beams may be rotated about the acoustic beam (i.e., $\beta \neq 0$). Then the light beam will be farther away from the optic axis but will still impinge on the acoustic waves at the angle $\theta$. In practice, we have found that the light beam may be as much as 20° away from the optic axis. However, as the angle $\gamma$ between the light beam and the optic axis increases two effects occur: (1) the inflection point frequency $f'$ is increased, which increases acoustic losses but may be desirable in some cases because the inflection frequency may be too low for a particular application, and (2) the deflection efficiency, that proportion of the incident beam which is deflected, is severely reduced. For example, with light at 0.4416 $\mu$m in the ($\bar{1}$10) plane ($\beta = 0$, $\gamma = \theta = 3°$) we measured $f' = 82$ MHz and, in the frequency band centered around $f'$, measured a deflection efficiency of 90 percent. In contrast, for $\beta = 12°$, $\gamma = 13°$ and $\theta = 4°$, approximately, we measured $f' = 110$ Mhz and a maximum deflection efficiency of 40–45 percent.

The end 18$b$ of the TeO$_2$, opposite end 18$a$ where the acoustic waves are launched, is provided with an acoustic absorber 26 which reduces reflections of the acoustic waves at end 18$b$ and thereby reduces subsequent spurious interactions with the light beam. For this purpose the mechanical impedance of the absorber should be as close as possible to that of TeO$_2$. Where however some mismatch exists, the end 18$b$ may be formed at a slight angle to the [110] direction so that the reflected acoustic waves are directed away from the region where the acoustooptic interaction takes place. Optionally the absorber 26 is mounted in a heat sink 32 which is particularly useful when the deflector is operated on a c.w. basis.

In a preferred embodiment of our invention the TeO$_2$ body was grown by the Czochralski growth technique starting with commercially obtained TeO$_2$ powder having a purity of 99.9999 percent. We have found that the purity of the starting material is directly related to the quality of the grown TeO$_2$ crystals. That is, appreciably lower optical scattering losses as well as lower acoustic absorption losses are obtained if the TeO$_2$ starting material is six nines pure as contrasted with prior art techniques which reportedly used starting material only as high as 99.98 percent pure. For example, at 50 MHz the acoustic loss in prior art TeO$_2$ is about 0.23 db/$\mu$sec, whereas in our six nines TeO$_2$ it was only about 0.04 db/$\mu$sec, nearly six times lower. Similarly, at 100 MHz the losses in prior art TeO$_2$ were 0.40 db/μsec, whereas in our six nines TeO₂ it was only 0.13 db/μsec, more than three times lower.

Figure 2B:
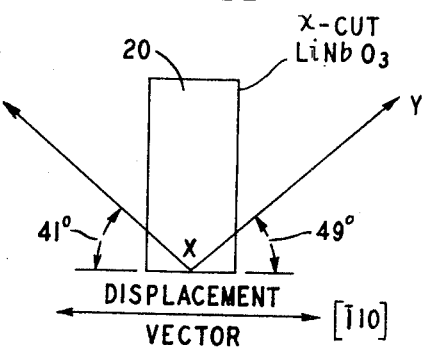
FIG. 2B is an enlarged view of a LiNbO$_3$ transducer for use in the embodiment of FIG. 2A.

Using such high quality TeO₂ crystals, we constructed an acoustooptic light deflector which has far surpassed the performance of the currently best known deflector which uses lead molybdate. More specifically, as shown in FIG. 2A, the TeO₂ body had dimensions $w = 8$ mm, $h = 9$ mm and $l = 22$ mm. We used an $x$-cut LiNbO₃ transducer, about 48 μm thick, cut as shown in FIG. 2B. That is, the displacement vector was in the [$\bar{1}$10] direction and at 41° and 49° to the $z$-axis and $y$-axis, respectively, in accordance with the teachings of U.S. Pat. No. 3,591,813 issued on July 6, 1971 and assigned to the assignee hereof. When driven by oscillator 24, this $x$-cut transducer launched acoustic shear waves in the [110] direction in the TeO₂ body 18. The absorber 26 comprised a block of magnesium affixed by an epoxy to the end 18$b$ which was cut at 2° off-normal. The mechanical impedance of magnesium is about 5.3 as compared to 3.6 for TeO₂. This mismatch produced an acoustic reflection of about 4 percent which was diverted by the off-normal cut of end face 18$b$.

In operation, the light beam from a He-Cd laser operating at 0.4416 μm was slightly elliptically polarized by a Soelil-Babinet compensator and was directed to the ($\bar{1}$10) plane ($\beta = 0°$) at an angle $\gamma = \theta$ of about 3° to the optic axis (i.e., to the [001] direction) of the TeO₂ body 18. By frequency modulating the electrical output of oscillator 24, the acoustic frequency was swept over a range from about 40 MHz to about 120 MHz and the incident and deflected angles were measured and plotted in FIG. 3. Curve II($a$) indicates the angle of the incident light beam and curve III($a$) indicates the corresponding angle of the deflected beam for each acoustic frequency. In contrast, curve I($a$) gives both the angle of incidence and the angle of deflection (which are equal) for normal Bragg deflection. Note that the handedness of the circularly polarized incident light beam is chosen so that curve II($a$), having the inflection point, results from the incident beam.

At an optical wavelength of 0.4416 μm, the inflection point occurs at $f' = 82$ MHz approximately, which corresponds to the point where the angle of the deflected beam is zero degrees and occurs at an incident angle (3.2°) which is twice that for normal Bragg deflection (1.6°). Illustratively, for a 60 percent bandwidth (i.e., $82 \pm 25$ MHz), the incident light beam spread ($\Delta\theta = \Lambda/L$) would have to be about 1.2° for normal Bragg deflection, but only about 0.2° in our invention. In addition, we can use an interaction length L which is six times longer which means that the acoustic power can be reduced by a factor of about six and the power density can be reduced by a factor of about 36. In addition, thermal strain problems are considerably alleviated, especially when the deflector is operated on a c.w. basis. Using this deflection system we have attained 500 resolvable spots with a 10 μ sec access time at 50 mW of acoustic power and 70 percent deflection efficiency. In comparison a lead molybdate deflector would require about two watts of acoustic power to achieve the same performance, or at the same acoustic power would have a deflection efficiency of only about 2 percent.

Figure 3:
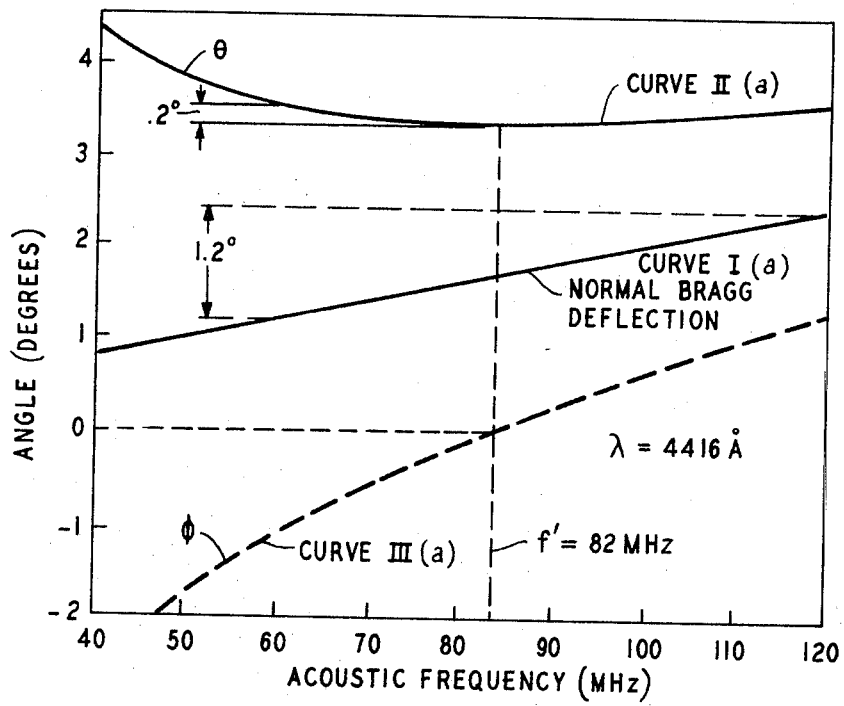
FIG. 3 is a graph of incident and/or deflection angle versus acoustic frequency for both normal Bragg deflection (curve I($a$)) and deflection in accordance with our invention (curves II($a$) and III($a$))
Figure 4:
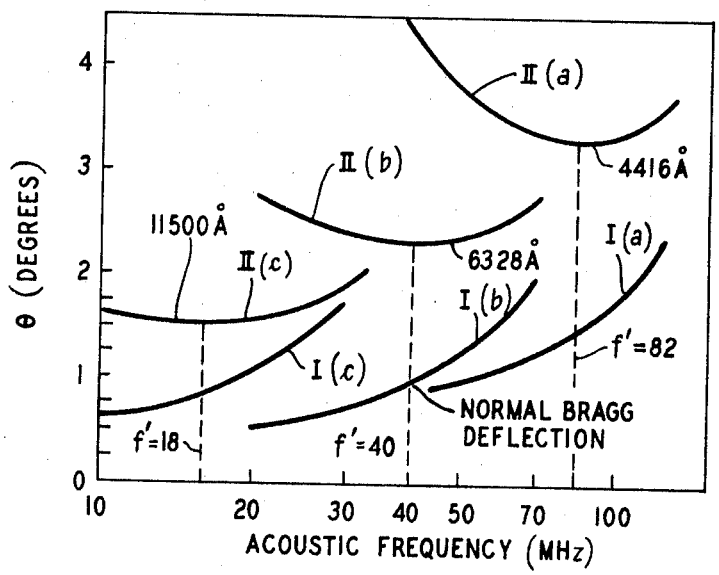
FIG. 4 is analogous to FIG. 3 showing curves for three different optical wavelengths.

Curves I($a$) and II($a$) of FIG. 3 are reproduced on FIG. 4 where the acoustic frequency is plotted logarithmically. Also shown are curves II($b$) and II($c$) which give the incident angles of light beams at wavelengths of 0.6328 μm and 1.15 μm, respectively, two typical outputs of a He-Ne laser. Curves I($b$) and I($c$) are the corresponding plots for normal Bragg angle deflection. Note that as the wavelength of light increases from 0.4416 μm to 0.6328 μm to 1.15 μm the inflection point frequency decreases from about 82 MHz to 40 MHz to 18 MHz.

Various possible design configurations arise from these different inflection point frequencies. Thus, assuming a 3 db acoustic loss is acceptable across the light beam aperture (i.e., in the [110] direction), then at 0.4416 μm and a center acoustic frequency of about 82 MHz = f', the light beam aperture D can be nearly 1 cm, and a 60 percent bandwidth would give $N = 750$ resolvable spots from equation (3). The access time $\tau$ would be about 16 μsec. On the other hand, for $N = 500$ spots and $\tau = 10$ μsec, the aperture could be $D = .62$ cm. The latter system would be particularly useful for real time display or hard copy systems. In contrast, at an optical wavelength of 0.6328 μm and an acoustic center frequency of about 40 MHz = f', a higher capacity N is possible because the acoustic loss decreases as the square of the acoustic frequency. Again assuming 3 db acoustic loss across the aperture and a 60 percent bandwidth, the aperture D can be about 3.5 cm which gives $N = 1600$ spots and $\tau = 60$ μsec. Further improvements can be attained by using optical wavelengths in the infrared range such as the 1.15 μm line of the He-Ne laser for which $f' = 18$ MHz approximately. For example, $N = 5000$ spots at $\tau = 500$ μsec are attainable provided that a TeO₂ crystal of large enough size can be grown (e.g., a crystal 30 cm long). Alternatively, $N = 500$ spots at $\tau = 50$ μsec can be attained in a 3 cm long bar of TeO₂. The latter type of system, when using for example, the relatively high power 1.06 μm line of a Nd:YAG laser, is particularly useful for machining operations.

It is to be understood that the above-described arrangements are merely illustrative of the many possible specific embodiments which can be devised to represent application of the principles of our invention. Numerous and varied other arrangements can be devised in accordance with these principles by those skilled in the art without departing from the spirit and scope of our invention. In particular, while examples were given above for the deflection of light at specific wavelengths, it is to be noted that our deflector is useful for all optical wavelengths in the optical passband of TeO₂, i.e., approximately 0.33 μm to 4.5 μm. In addition, a pair of our deflectors may be used for deflection in orthogonal directions, or one of our deflections may be used to scan rapidly in one direction and another type of deflector, such as a galvanometer, may be used to scan more slowly in an orthogonal direction. The latter type of arrangement might be particularly useful to form a rastor in a real time display system.

What is claimed is:

1. An acoustooptic arrangement for deflecting an optical beam comprising
   a body of paratellurite tellurium dioxide,
   means for generating acoustic shear waves which propagate along the [110] direction in said body,
   means for frequency modulating said acoustic waves, thereby to angularly deflect said beam by an amount related to the acoustic frequency, and means for elliptically polarizing said light beam and for directing said beam at a small angle to the optic axis of said body, said arrangement having an angle of incidence-versus-acoustic frequency characteristic which exhibits an inflection point at a different frequency for different optical wavelengths, and said modulating means having a center frequency approximately equal to the inflection point frequency corresponding to the wavelength of said optical beam.

2. The arrangement of claim 1 wherein said optical beam has a wavelength of about 0.4416 $\mu$m and said inflection point frequency is about 82 MHz.

3. The arrangement of claim 1 wherein said optical beam has a wavelength of about 0.6328 $\mu$m and said inflection point frequency is about 40 MHz.

4. The arrangement of claim 1 wherein said optical beam has a wavelength of about 1.15 $\mu$m and said inflection point frequency is about 18 MHz.

5. The arrangement of claim 1 wherein the direction of said light beam is not greater than 20° from the direction of said optic axis.

6. The arrangement of claim 1 in combination with an acoustic absorber adapted to attenuate said shear waves after they interact with said optical beam.

7. The arrangement of claim 6 wherein said absorber comprises a magnesium body affixed to said tellurium dioxide body.

8. The arrangement of claim 7 wherein one end of said tellurium dioxide body upon which said shear waves are incident after interaction with said beam is disposed at an angle to the direction of propagation of said shear waves and said magnesium body is affixed to said one end.

9. The arrangement of claim 1 wherein said generating means includes an x-cut lithium niobate transducer bonded to an end of said tellurium dioxide body opposite to said one end.

10. The arrangement of claim 1 wherein said tellurium dioxide body has low optical scattering loss and low acoustic absorption loss and is a single crystal grown by a Czochralski growth technique from at least 99.9999 percent pure polycrystalline tellurium dioxide.

11. An acoustooptic arrangement for deflecting an optical beam comprising an elongated body of single crystal paratellurite $TeO_2$ grown by a Czochralski growth technique from at least 99.9999 percent pure polycrystalline $TeO_2$ in order to produce a low optical scattering loss and low acoustic absorption loss in said body, said body being disposed in the path of said optical beam, an x-cut $LiNbO_3$ transducer bonded to one end of said body so that its x-axis is along the [110] direction of said body, its z-axis is about 41° to the [$\bar{1}$10] direction and its y-axis is about 49° to the [$\bar{1}$10] direction, a magnesium acoustic absorber affixed to the opposite end of said body, a heat sink thermally coupled to said absorber, oscillator means for generating a frequency modulated electrical signal, the output of said oscillator means being coupled to said transducer to launch in said body acoustic shear waves which propagate in the [110] direction and which are polarized in the [$\bar{1}$10] direction, said acoustic shear waves being effective to deflect said optical beam by angular amounts related to the acoustic frequency, means for elliptically polarizing said light beam and for directing said beam at a small angle to the optic axis of said body, said angle being not greater than 20°, said arrangement having an angle of incidence-versus-acoustic frequency characteristic which exhibits an inflection point at a different frequency for different optical wavelengths, and the center frequency of said frequency modulated signal being approximately equal to the inflection point frequency corresponding to the wavelength of said optical beam.

12. The arrangement of claim 11 wherein said optical beam is generated by a He-Cd laser at 0.4416 $\mu$m and said inflection point frequency is about 82 MHz.

13. The arrangement of claim 11 wherein said optical beam is generated by a He-Ne laser at 0.6328 $\mu$m and said inflection point frequency is about 40 MHz.

14. The arrangement of claim 11 wherein said optical beam is generated by a He-Ne laser at 1.15 $\mu$m and said inflection point frequency is about 18 MHz.

* * * * *